US007729800B2

(12) United States Patent
Sudolcan et al.

(10) Patent No.: US 7,729,800 B2
(45) Date of Patent: Jun. 1, 2010

(54) DISTRIBUTED ARCHITECTURE FOR FOOD AND BEVERAGE DISPENSERS

(75) Inventors: David C. Sudolcan, Atascosa, TX (US); Thomas J. Chadwell, San Antonio, TX (US)

(73) Assignee: Lancer Partnership Ltd., San Antonio, TX (US)

( * ) Notice: Subject to any disclaimer, the term of this patent is extended or adjusted under 35 U.S.C. 154(b) by 777 days.

(21) Appl. No.: 11/502,221

(22) Filed: Aug. 10, 2006

(65) Prior Publication Data

US 2006/0276929 A1 Dec. 7, 2006

Related U.S. Application Data

(62) Division of application No. 10/854,749, filed on May 26, 2004, now abandoned.

(51) Int. Cl.
*G06F 17/00* (2006.01)

(52) U.S. Cl. ........................ 700/241; 700/236; 700/244

(58) Field of Classification Search ................ 700/236, 700/241, 244
See application file for complete search history.

(56) References Cited

U.S. PATENT DOCUMENTS

| | | | | |
|---|---|---|---|---|
| 4,827,426 | A * | 5/1989 | Patton et al. | 700/240 |
| 5,769,271 | A * | 6/1998 | Miller | 222/1 |
| 6,401,010 | B1 * | 6/2002 | Takahashi | 700/231 |
| 6,799,085 | B1 * | 9/2004 | Crisp, III | 700/236 |

* cited by examiner

*Primary Examiner*—Gene Crawford
*Assistant Examiner*—Timothy R Waggoner
(74) *Attorney, Agent, or Firm*—Christopher L. Makay

(57) ABSTRACT

A method and apparatus wherein traditional design methodologies directed toward obtaining minimized component costs are largely set aside in favor of mass customization, reduced design and ownership costs, and shorter design cycles. The distributed architecture contemplates widespread distribution of monitoring and control functions for most device-specific hardware under the direction of a CPU module. In implementation of the distributed architecture, various component modules are placed in communication with the CPU module through at least one and preferably multiple communication busses.

11 Claims, 9 Drawing Sheets

DISTRIBUTED ARCHITECTURE FOR FOOD AND BEVERAGE DISPENSERS

CROSS-REFERENCE TO RELATED APPLICATION

This application is a divisional of patent application Ser. No. 10/854,749, which was filed May 26, 2004 now abandoned.

FIELD OF THE INVENTION

The present invention relates to food and beverage dispenser design. More particularly, the invention relates to a method and apparatus for implementing food and beverage dispensers, wherein traditional design methodologies directed toward obtaining minimized component costs are largely set aside in favor of mass customization, reduced design and ownership costs, and shorter design cycles.

BACKGROUND OF THE INVENTION

The food and beverage dispenser industry is continuously challenged to produce dispensers of widely varied specification. For example, a particular restaurant chain may desire a dispenser having a keypad with a particular number and type of identified flavors with or without automated portion controls while another restaurant chain may desire a keypad having only simple on and off type controls for one or two beverage products. Depending upon the specifications of the desired dispenser, keypads and/or flow control valves of widely varying capabilities may be necessary. Traditionally, the industry has met customer needs by determining the necessary components and then designing a centralized controller comprising necessary hardware and software for operation of the various keypads, valve modules and the like. Unfortunately, this usually results in the design of another unique centralized controller for each dispenser. Consequently, the industry is generally hampered in its efforts to quickly and economically respond to customer requests. Further, a simple modification such as the addition of a single button to a keypad could necessitate complete redesign of the controller, which may be prohibitively costly.

It is therefore an object of the present invention to entirely overhaul the manner in which food and beverage type dispensers are produced such that minor and even major configuration changes may be handled with minimal time and effort. Additionally, it is an object of the present invention to set forth such a design methodology that in no manner limits the introduction of improved or more capable components. Finally, it is an object of the present invention to set forth such a design methodology that in fact reduces overall cost of ownership of a food or beverage dispenser.

SUMMARY OF THE INVENTION

In a distributed architecture for a food/beverage dispenser, a CPU module controls operations for the food/beverage dispenser, and a first component module coupled with the CPU module controls a first operation of the food/beverage dispenser responsive to instructions received from the CPU module. A first bus connects the CPU module with the first component module, and a communications interface interfaces the CPU module with the first component module. A second component module connected to the CPU module through a bus connection to the first component module controls a first operation of the food/beverage dispenser responsive to instructions received from the CPU module. Alternatively, a second component module connected to the CPU module through a bus connection to the first component module controls a second operation of the food/beverage dispenser responsive to instructions received from the CPU module. Each of the first and second component modules includes a microcontroller that executes the first and/or second operations of the food/beverage dispenser responsive to instructions received from the CPU module. Each of the first and second component modules includes a bus interface that controls access to the first bus for the microcontrollers of the first and second component modules.

A second component module connected with the CPU module via a second bus controls a second operation of the food/beverage dispenser responsive to instructions received from the CPU module. The communications interface interfaces the CPU module with the second component module. A third component module connected to the CPU module through a bus connection to the second component module controls a second operation of the food/beverage dispenser responsive to instructions received from the CPU module. Alternatively, a third component module connected to the CPU module through a bus connection to the second component module controls a third operation of the food/beverage dispenser responsive to instructions received from the CPU module. Each of the second and third component modules includes a microcontroller that executes the second and/or third operations of the food/beverage dispenser responsive to instructions received from the CPU module. Each of the second and third component modules includes a bus interface that controls access to the second bus for the microcontrollers of the first and second component modules.

The CPU module includes a microcontroller, a ROM, a RAM, a non-volatile memory, an auxiliary communications interface. The microcontroller executes programming instructions that facilitate operations for the food/beverage dispenser. The ROM stores the application code executed by the microcontroller in facilitating operations for the food/beverage dispenser. The RAM stores variables required by the microcontroller in executing the programming instructions that facilitate the operations for the food/beverage dispenser. The non-volatile memory stores configuration information required by the microcontroller to execute application code stored in the ROM and historical information for the food/beverage dispenser. The auxiliary communications interface interfaces the CPU module with external devices. A low power module, a medium power module, or a high power module supplies power to the CPU module.

In a distributed architecture for a food/beverage dispenser, a CPU module controls operations for the food/beverage dispenser and a first component module coupled with the CPU module controls an operation of the food/beverage dispenser responsive to instructions received from the CPU module. The first component module is enabled during initialization of the food/beverage dispenser such that the first component module responds to a component identifier signal output by the CPU module. The CPU module assigns an address for the first component module after receiving a response to the component identifier signal. Further, the CPU module requests the first component module provide a component type after assigning an address to the first component module.

A second component module coupled to the CPU module through a bus connection with the first component module controls an operation of the food/beverage dispenser responsive to instructions received from the CPU module. The CPU module instructs the first component module to enable the second component module after assigning an address to the first component module. The CPU module outputs a component identifier signal and instructs the first component module to ignore the component identifier signal. The second component module thus responds to the component identifier signal output from the CPU module. The CPU module accordingly assigns an address for the second component module after receiving a response to the component identifier signal. The CPU module further requests the second component module provide a component type after assigning an address to the second component module.

It is therefore an object of the present invention to provide a distributed architecture for a food/beverage dispenser that overcomes limited space issues.

It is another object of the present invention to provide a distributed architecture for a food/beverage dispenser that streamlines the design or modification of the food/beverage dispenser.

It is a further object of the present invention to provide a distributed architecture that distributes monitoring and control functions to component modules so that such functions do not require centralization on a CPU module 10.

Still other objects, features, and advantages of the present invention will become evident to those of ordinary skill in the art in light of the following.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Referring to the Figures, a CPU module 10 of the present invention permits implementation of a distributed architecture in a food/beverage dispenser 17 such that traditional design methodologies directed toward obtaining minimized component costs are largely set aside in favor of mass customization, reduced design and ownership costs, and shorter design cycles.

Figure 1:
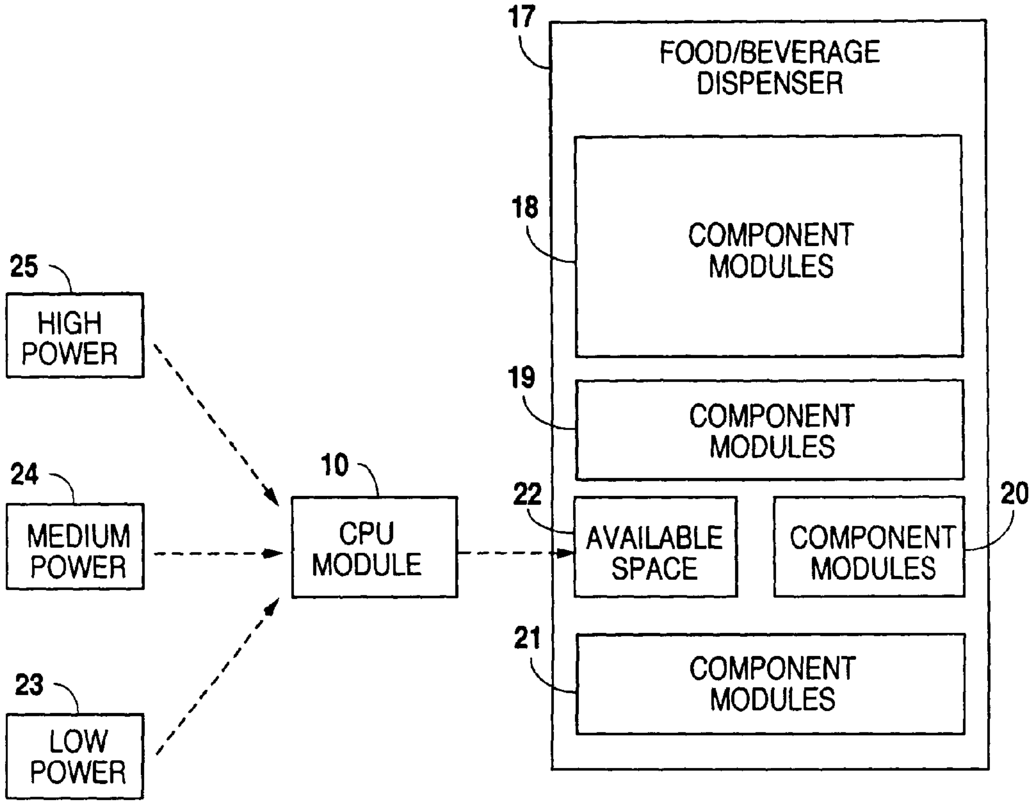
FIG. 1 shows, in a functional block diagram, placement of a CPU module according to the preferred embodiment of the present invention in a food/beverage dispenser.

As illustrated in FIG. 1, the food/beverage dispenser 17 includes component modules 18-21 that operate to dispense a food and/or a beverage. It should be understood the size, location, and number of component modules 18-21 depicted within the food/beverage dispenser 17 are merely exemplary. The component modules 18-21 are arranged within the food/beverage dispenser 17 according to component module function, size, available space within the housing of the food/beverage dispenser 17, and component module interaction requirements. Unfortunately, an arrangement of the component modules 18-21 that provides desired mechanical performance of the food/beverage dispenser 17 often leaves little room for the control electronics necessary to operate the component modules 18-21. Furthermore, software changes necessary to meet varying customer demands as well as the choice of component modules 18-21 create a situation where control electronics design is both time consuming and costly.

The CPU module 10 in this preferred embodiment overcomes limited space issues within the food/beverage dispenser 17 through the inclusion of hardware adapted to fit within any suitable available space 22 of the food/beverage dispenser 17. The CPU module 10 is further easily connectable to each of the component modules 18-21 to permit communications therebetween. Still further, the CPU module 10 streamlines the design or modification of the food/beverage dispenser 17 because the CPU module 10 facilitates the widespread distribution of monitoring and control functions to the component modules 18-21 so that such functions do not require centralization on the CPU module 10. As such, component modules from any source may be implemented in the food/beverage dispenser 17 with little or no required changes to the CPU module 10.

The CPU module 10 in this preferred embodiment may be used in combination with one of power modules 23-25, each of which includes hardware adapted to fit within any suitable available space 22 of the food/beverage dispenser 17. Each power module 23-25 is connectable to the CPU module 10 to provide power thereto. Further, the CPU module 10 distributes power received from the connected power module 23-25 to the component modules 18-21, thereby supplying necessary power thereto. The CPU module 10 is used in combination with one of power modules 23-25 due to the different power requirements of the various food/beverage dispensers 17. Illustratively, one food/beverage dispenser 17 may require less power than another food/beverage dispenser 17, which can be satisfied through the use of the low power module 23. A food/beverage dispenser 17 requiring more power might include either the medium power module 24 or the high power module 25, depending upon the total power requirement of the food/beverage dispenser 17. The power modules 23-25 therefore provide cost savings in that the power requirements of any given food/beverage dispenser 17 are specifically satisfied. Although the preferred embodiment discloses the power modules 23-35 as separate power supplies connected to the CPU module 10, those of ordinary skill in the art will recognize that the power modules 10 may be incorporated into the CPU module 10.

Figure 2:
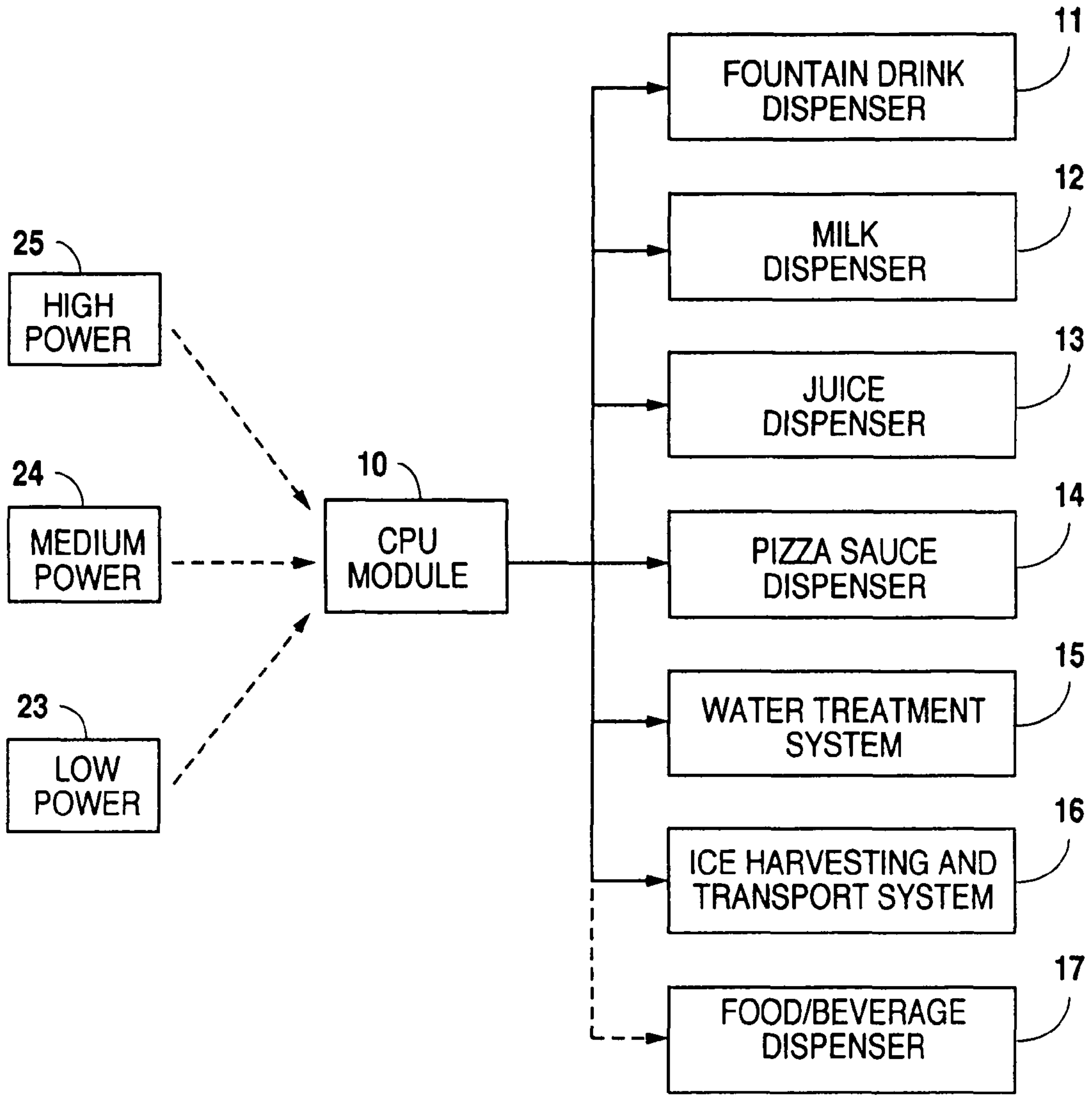
FIG. 2 shows, in a functional block diagram, exemplary food/beverage dispensers that may implement a CPU module according to the preferred embodiment of the present invention.

As illustrated in FIG. 2, the implementation of a distributed architecture through the inclusion of the CPU module 10 allows the CPU module 10 to be incorporated in a variety of food/beverage dispensers 17. Illustratively, the CPU module 10 may be incorporated in a fountain drink dispenser 11, which dispenses fountain drinks, such as Coke™, Sprite™, and the like; a milk dispenser 12; or a juice dispenser 13, which dispenses juices, such as orange, apple, and the like. Additional dispensers include a pizza sauce dispenser 14, which delivers pizza sauce onto a crust prior to baking; a water treatment system 15, which treats water to remove impurities prior to delivery to an end user; or an ice harvesting and transport system 16, which includes an ice source that provides ice that is transported to a remote location such as an ice bin. It should be understood that the fountain drink dispenser 11, milk dispenser 12, juice dispenser 13, pizza sauce dispenser 14, water treatment system 15, and ice harvesting and transport system 16, are merely exemplary types of food and beverage dispensers and that any type of equipment related to the dispensing of food and beverages may implement a distributed architecture through the inclusion of the CPU module 10.

Figure 3:
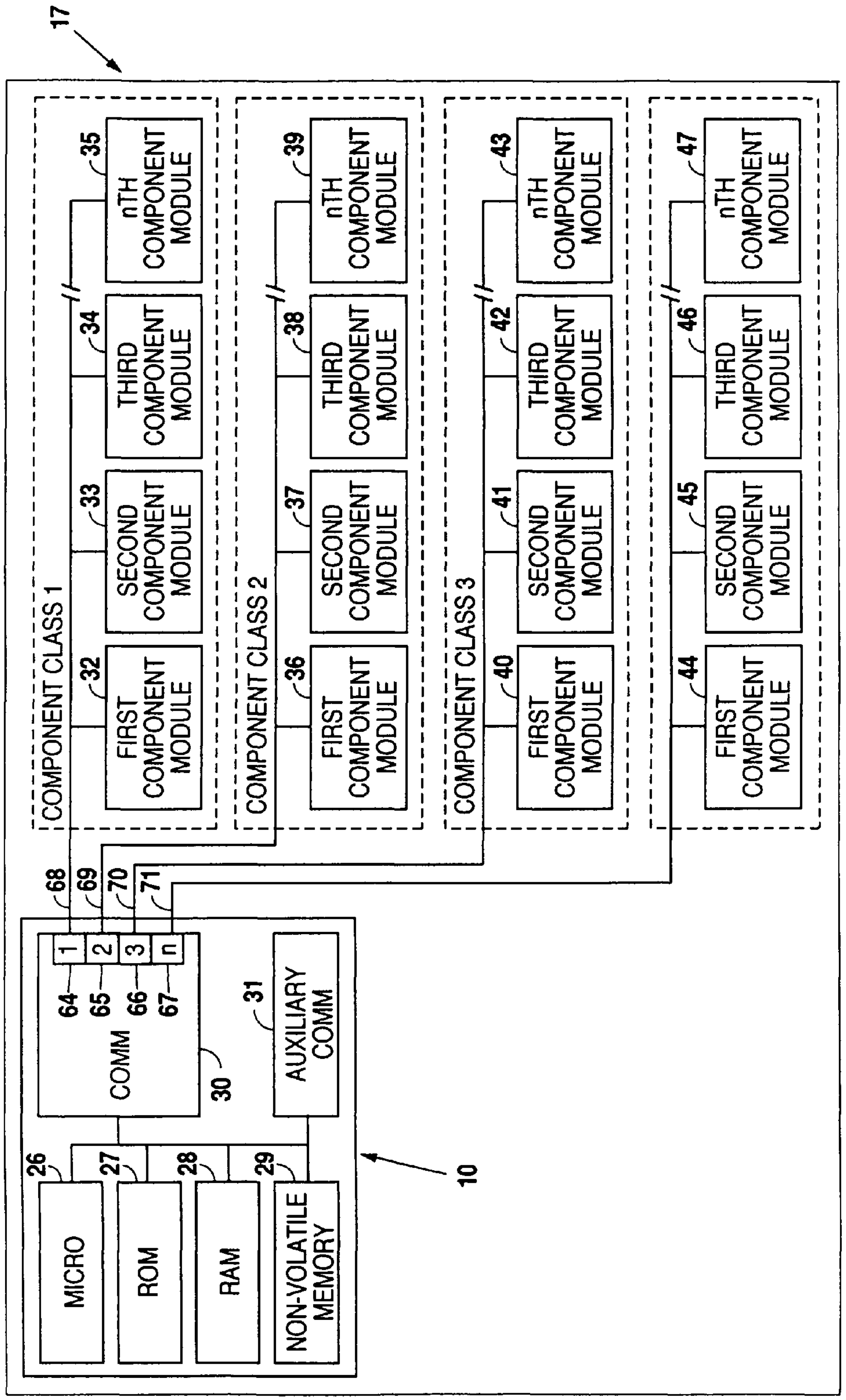
FIG. 3 shows, in a functional block diagram, CPU module hardware and the connection of the CPU module hardware to component modules of a food/beverage dispenser.
Figure 4:
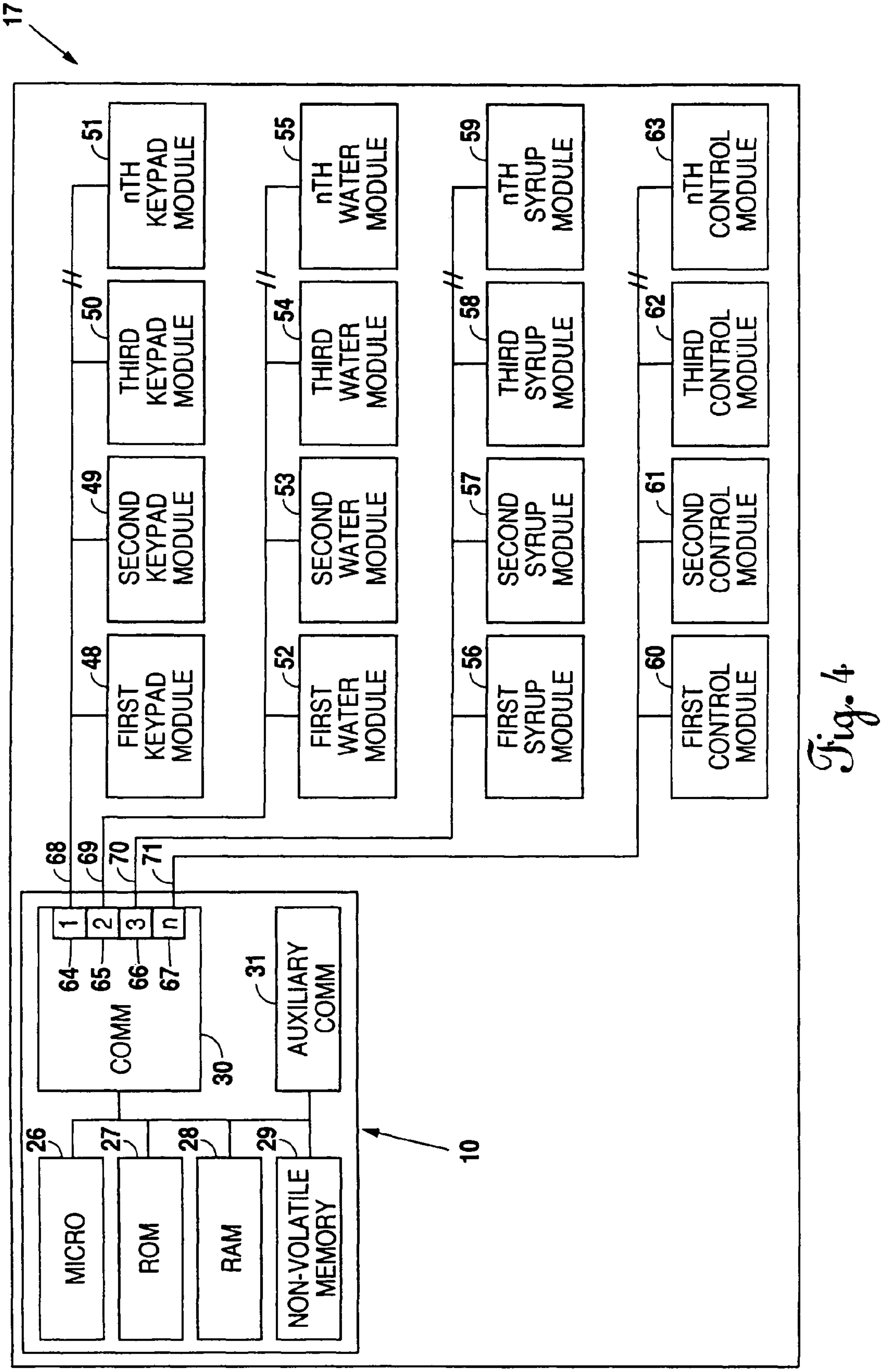
FIG. 4 shows, in a functional block diagram, CPU module hardware and the connection of the CPU module hardware to component modules of a fountain drink dispenser.

As illustrated in FIGS. 3 and 4, the CPU module 10 includes a microcontroller 26, ROM 27, RAM 28, non-volatile memory 29, a communication interface 30, and an auxiliary communication interface 31. The microcontroller 26 is any microcontroller or microprocessor suitable to execute the programming instructions necessary for the CPU module 10 to facilitate the operations for the food/beverage dispenser 17. The ROM 27 is any ROM suitable to store the application code executed by the microcontroller 26 in facilitating the operations for the food/beverage dispenser 17. The RAM 28 is any RAM suitable to store the variables required by the microcontroller 26 in executing the programming instructions that facilitate the operations for the food/beverage dispenser 17. The non-volatile memory 29 is any non-volatile memory, such as an EEPROM, suitable to store configuration information required by the microcontroller 26 to execute the application code stored in the ROM 27. The non-volatile memory 29 is further any non-volatile memory suitable to store historical information for the food/beverage dispenser 17, such as for example number or dispenses, flavor selected for each dispense, frequency of dispenses for any flavor, or the like. The communications interface 30 is any communications interface, such as RS485 or the like, that furnishes the communications capability necessary to interface the microcontroller 26 with the component modules of the food/beverage dispenser 17. The auxiliary communications interface 31 is any communications interface, such as RS232, an Ethernet connection, or the like, that furnishes the communications capability necessary to interface the CPU module 10 with an external device, including but not limited to a PC, laptop computer, palm pilot, or the like, that communicates information to or receives information from the CPU module 10. It should be understood that, although the hardware of the CPU module 10 is illustrated separately, such hardware could be combined in any combination as individual integrated circuits. Illustratively, the auxiliary communications interface 31 could be implemented through an unused port of the communications interface 30 whereby the auxiliary communications interface 31 would be coupled to the microcontroller 26 via the communications interface 30.

FIG. 3 provides a generic illustration of a food/beverage dispenser 17 whereby the food/beverage dispenser 17 includes first through $n^{th}$ component modules 32-47 grouped according to component classes 1-n or first through $n^{th}$ component modules 32-43 grouped according to component classes 1-3 and any additional component modules 44-47 that are not related in a class yet are important to the proper operation of the food/beverage dispenser 17. In this preferred embodiment, a component class is any group of component modules that perform the same task. At a minimum, a food/beverage dispenser 17 need only include component modules that provide the functionality necessary to dispense the desired food or beverage to an end user. The number of component modules is determined by the desired dispense, and an illustration of necessary component modules may include as little as a delivery device module, such as a pump module, connected at an input side to a product source; a metering device module, such as a on/off valve module, connected to an output side of the delivery device module; and a nozzle connected to the metering device module to deliver product to an end user. A typical food/beverage dispenser 17 would include more component modules to effect a dispense as well as component modules employed to create user-friendly features, such as a user interface or user display. Accordingly, a food/beverage dispenser 17 would include at least one component module and more practically multiple component modules, some of which are grouped in component classes.

FIG. 4 provides an illustration of a fountain drink dispenser 11 whereby the fountain drink dispenser 11 includes first through $n^{th}$ keypad modules 48-51 grouped in component class 1, first through $n^{th}$ water modules 52-55 grouped in component class 2, first through $n^{th}$ syrup modules 56-59 grouped in component class 3, and an ice bank control module 60, a liquid level control module 61, an agitation control module 62, and a user interface module 63. The number of keypad modules, water modules, and syrup modules may be 1 through n depending upon the customer requirements. The first through $n^{th}$ keypad modules 48-51 provide a component class 1 that performs the task of permitting a user to initiate a dispense from the fountain drink dispenser 11. The first through $n^{th}$ water modules 52-55 provide a component class 2 that performs the task of delivering either plain or carbonated water to an end user in the production of a fountain drink. The first through $n^{th}$ syrup modules 56-59 provide a component class 3 that performs the task of delivering syrup to an end user for mixing with the plain or carbonated water in the production of a fountain drink. The ice bank control module 60, the liquid level control module 61, and the agitation control module 62 are additional component modules unrelated in a class that perform tasks important to the proper operation of the fountain drink dispenser 11. Illustratively, the ice bank control module 60 regulates a refrigeration unit in the production of an ice bank utilized to chill the syrup, carbonated water, and/or plain water. The liquid level control module 61 regulates the level of water in a carbonation unit employed to produce carbonated water. The agitation control module 62 regulates an agitator that circulates water about the ice bank. The user interface module 63 however is an additional component module unrelated in a class that creates a user-friendly feature whereby LED's, LCD's, or the like provide visual information to an end user of the fountain drink dispenser 11. It should be understood the fountain drink dispenser 11 illustrated in FIG. 4 provides an example of the number and type of component modules in a food/beverage dispenser and that many other number and type of component modules may be implemented.

After the CPU module 10 and a power module 23-25 are installed in the food/beverage dispenser 17, the CPU module 10 must be physically connected to the first through $n^{th}$ component modules 32-47 of component classes 1-n of the food/beverage dispenser 17 or first through $n^{th}$ component modules 32-43 of component classes 1-3 and any additional component modules 44-47 of the food/beverage dispenser 17 to permit communication therebetween. The connection of the CPU module 10 not only permits communication but may also allow the distribution of power from an installed power module 23-25 to the first through $n^{th}$ component modules 32-47 of component classes 1-n of the food/beverage dispenser 17 or first through $n^{th}$ component modules 32-43 of component classes 1-3 and any additional component modules 44-47 of the food/beverage dispenser 17. Alternatively, an installed power module 23-25 may be directly connected with the first through $n^{th}$ component modules 32-47 of component classes 1-n of the food/beverage dispenser 17 or first through $n^{th}$ component modules 32-43 of component classes 1-3 and any additional component modules 44-47 of the food/beverage dispenser 17 to furnish power thereto. Although those of ordinary skill in the art will recognize that communications between the CPU module 10 and the first through $n^{th}$ component modules 32-47 of component classes 1-n of the food/beverage dispenser 17 or first through $n^{th}$ component modules 32-43 of component classes 1-3 and any additional component modules 44-47 of the food/beverage dispenser 17 could be implemented with a single bus, practical considerations, such as limited available space within the housing of the food/beverage dispenser 17, differing locations of component modules within the housing of the food/beverage dispenser 17, the necessity of maintaining proper response times between the CPU module 10 and the component modules of the food/beverage dispenser 17, and the ability of the CPU module 10 to respond to transients, will often dictate the provision of more than a single bus. The communications interface 30 accordingly includes 1-n bus connectors 64-67 that allow 1-n busses 68-71 to be distributed among the component modules of the food/beverage dispenser 17. Illustratively, a bus 68 is connected to the bus connector 64 of the communications interface 30 and to each of first through $n^{th}$ component modules 32-35 of component class 1. A bus 69 is connected to the bus connector 65 of the communications interface 30 and to each of first through $n^{th}$ component modules 36-39 of component class 2. A bus 70 is connected to the bus connector 66 of the communications interface 30 and to each of first through $n^{th}$ component modules 40-43 of component class 3. A bus 71 is connected to the bus connector 67 of the communications interface 30 and to each of first through $n^{th}$ component modules 44-47 of component class n or to each of first through $n^{th}$ additional component modules 44-47.

Similarly, after the CPU module 10 and a power module 23-25 are installed in the fountain drink dispenser 11, the CPU module 10 must be physically connected to the first through $n^{th}$ keypad modules 48-51 of component class 1, the first through $n^{th}$ water modules 52-55 of component class 2, the first through $n^{th}$ syrup modules 56-59 of component class 3, and the ice bank control module 60, the liquid level control module 61, the agitation control module 62, and the user interface module 63 to permit communication therebetween. The connection of the CPU module 10 not only permits communication but also allows the distribution of power from an installed power module 23-25 to the first through $n^{th}$ keypad modules 48-51 of component class 1, the first through $n^{th}$ water modules 52-55 of component class 2, the first through $n^{th}$ syrup modules 56-59 of component class 3, and the ice bank control module 60, the liquid level control module 61, the agitation control module 62, and the user interface module 63. Although those of ordinary skill in the art will recognize that the communications could be implemented with a single bus, practical considerations as previously described dictate the provision of more than a single bus. Furthermore, separation onto separate busses of time sensitive component modules, such as first through $n^{th}$ water modules 52-55 and first through $n^{th}$ syrup modules 56-59 may be desirable to prevent compromise of dispense operations due to latency in communications. Alternatively, less time sensitive component modules, such as the ice bank control module 60, the liquid level control module 61, the agitation control module 62, and the user interface module 63 may be placed on a more crowded bus. The communications interface 30 accordingly includes 1-n bus connectors 64-67 that allow 1-n busses 68-71 to be distributed among the component modules of the fountain drink dispenser 11. Illustratively, a bus 68 is connected to the bus connector 64 of the communications interface 30 and to each of first through $n^{th}$ keypad modules 48-51 of component class 1. A bus 69 is connected to the bus connector 65 of the communications interface 30 and to each of first through $n^{th}$ water modules 52-55 of component class 2. A bus 70 is connected to the bus connector 66 of the communications interface 30 and to each of first through $n^{th}$ syrup modules 56-59 of component class 3. A bus 71 is connected to the bus connector 67 of the communications interface 30 and to each of the ice bank control module 60, the liquid level control module 61, the agitation control module 62, and the user interface module 63.

Figure 5:
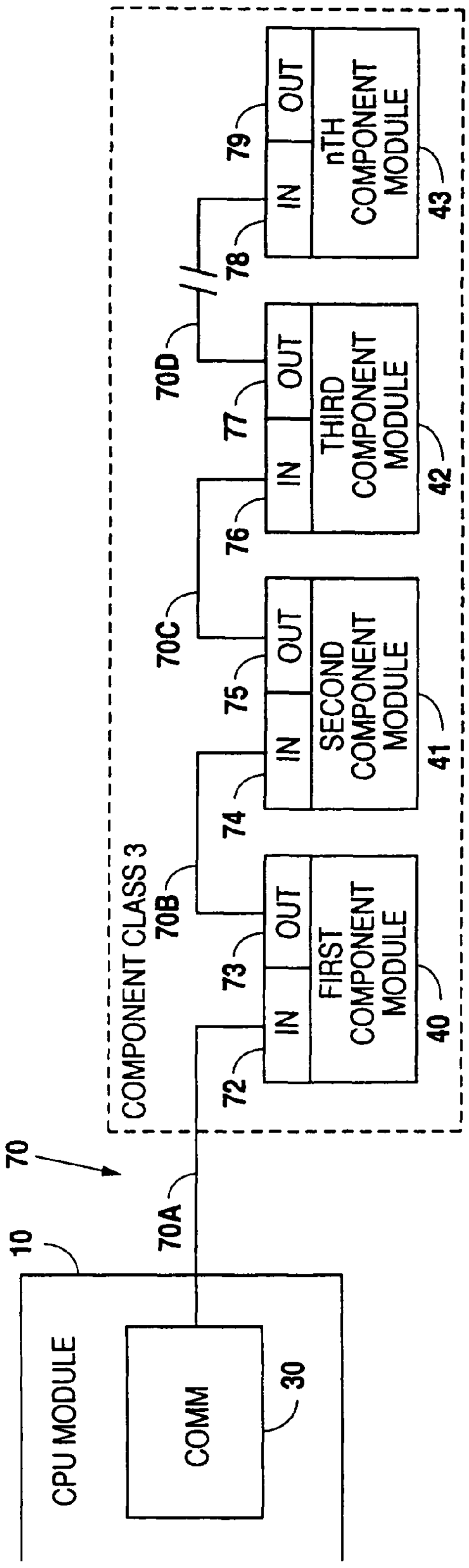
FIG. 5 shows, in a functional block diagram, a communication interface of the CPU module hardware and the connection of the communication interface to component modules of a food/beverage dispenser.
Figure 6:
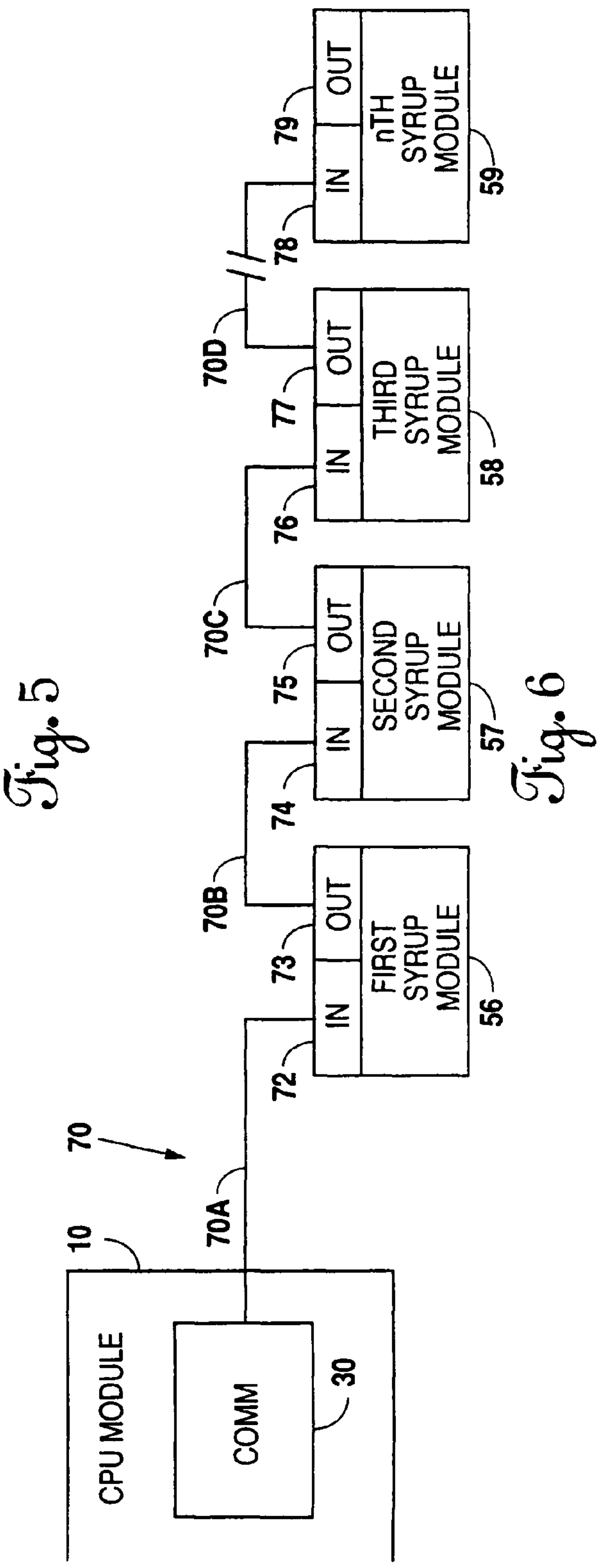
FIG. 6 shows, in a functional block diagram, a communication interface of the CPU module hardware and the connection of the communication interface to syrup modules of a fountain drink dispenser.

As illustrated in FIGS. 5 and 6, the first through $n^{th}$ component modules 40-43 or the first through $n^{th}$ syrup modules 56-59 of component class 3 are connected to the communications interface 30 of the CPU module 10 via the bus 70 in a daisy chain configuration. The preferred embodiment implements a daisy chain configuration to eliminate the wiring necessary to connect each of the first through $n^{th}$ component modules 40-43 or the first through $n^{th}$ syrup modules 56-59 of component class 3 directly to the communications interface 30 of the CPU module 10. A bus 70A of bus 70 connects from the communications interface 30 to an input 72 of the first component module 40 or the first syrup module 56. A bus 70B of bus 70 connects from an output 73 of the first component module 40 or the first syrup module 56 to an input 74 of the second component module 41 or the second syrup module 57. A bus 70C of bus 70 connects from an output 75 of the second component module 41 or the second syrup module 56 to an input 76 of the third component module 42 or the third syrup module 58. A bus 70D of bus 70 connects from an output 77 of the third component module 42 or the third syrup module 57 to an input 78 of the $n^{th}$ component module 43 or the $n^{th}$ syrup module 59.

FIGS. 5 and 6 show only the first through $n^{th}$ component modules 40-43 or the first through $n^{th}$ syrup modules 56-59 of component class 3 to provide an example illustration of the bus connection scheme implemented by the preferred embodiment. Those of ordinary skill in the art will accordingly understand the first through $n^{th}$ component modules 32-35 or the first through $n^{th}$ keypad modules 48-51 of component class 1, the first through $n^{th}$ component modules 36-39 or the first through $n^{th}$ water modules 52-55 of component class 2, the first through $n^{th}$ component modules 44-47 of component class n or the first through $n^{th}$ additional component modules 44-47, and the ice bank control module 60, the liquid level control module 61, the agitation control module 62, and the user interface module 63 may be connected similarly. Furthermore, while the preferred embodiment contemplates a daisy chain configuration for the connection of component modules to the CPU module 10, those of ordinary skill in the art will recognize other configurations, such as point to point cables from the CPU module 10 to each component module, a custom cable or cables from the CPU module 10 to arrays of the component modules, or the like.

Figure 7:
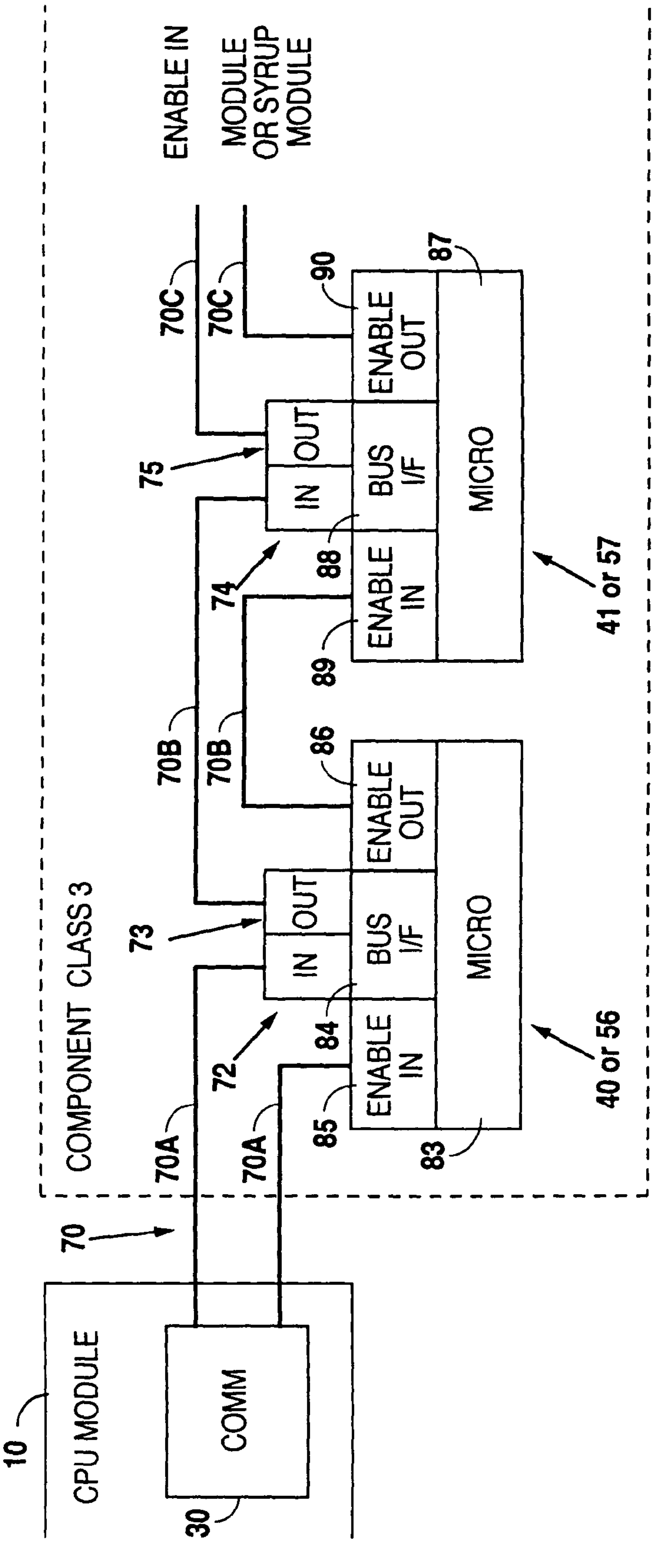
FIG. 7 shows, in a functional block diagram, a preferred embodiment of a communication interface of the CPU module hardware, component modules of a food/beverage dispenser or syrup modules of a fountain drink dispenser, and the connections therebetween.
Figure 8A:
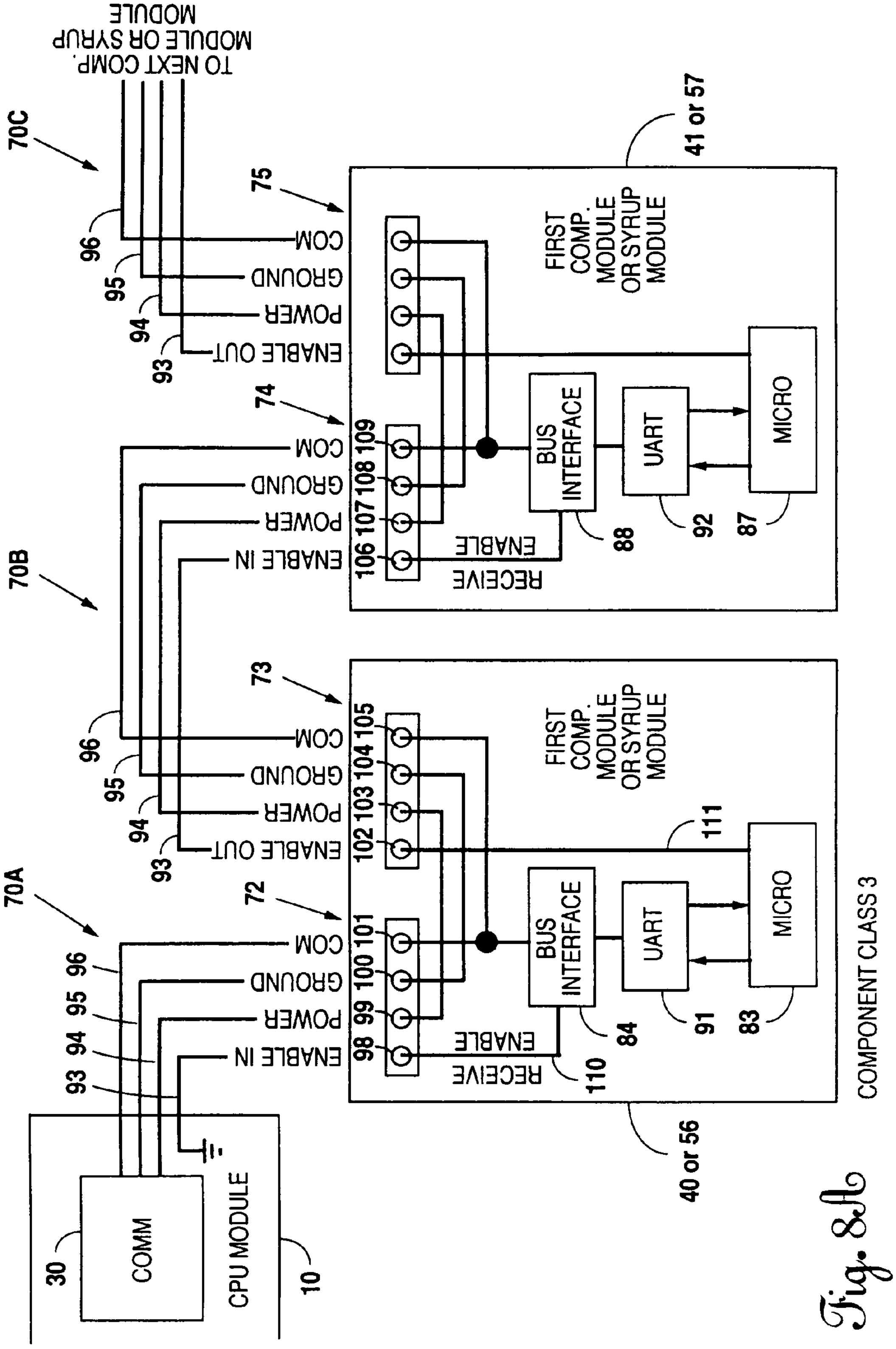
FIG. 8A shows, in a schematic diagram, one embodiment of a communication interface of the CPU module hardware, component modules of a food/beverage dispenser or syrup modules of a fountain drink dispenser, and the connections therebetween.
Figure 8B:
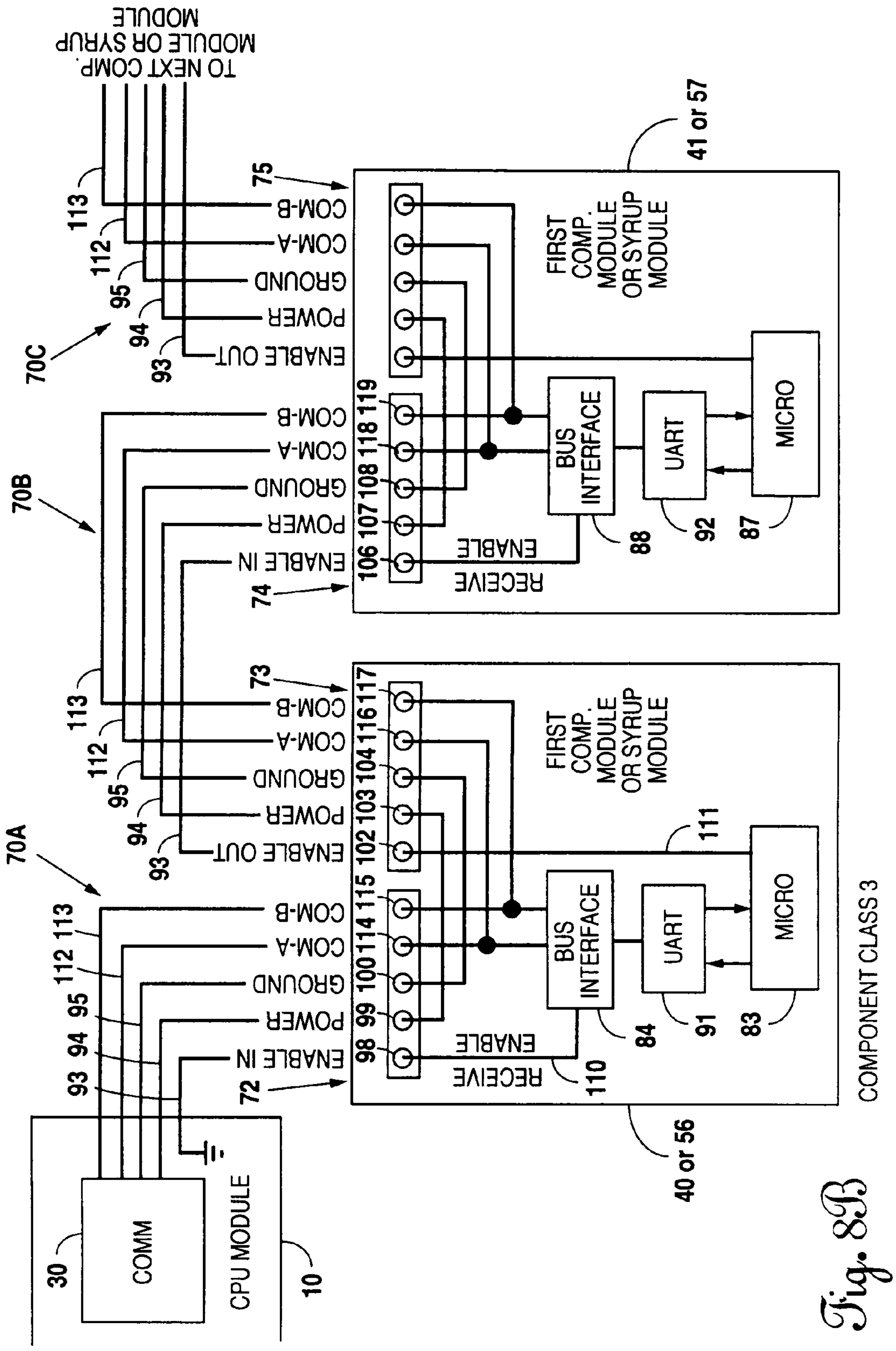
FIG. 8B shows, in a schematic diagram, a preferred embodiment of a communication interface of the CPU module hardware, component modules of a food/beverage dispenser or syrup modules of a fountain drink dispenser, and the connections therebetween.

As illustrated in FIGS. 7-8B, the first component module 40 or the first syrup module 56 includes a microcontroller 83 and a bus interface 84, an enable in 85, and an enable out 86 of the input 72 and the output 73. Similarly, the second component module 41 or the second syrup module 57 includes a microcontroller 87 and a bus interface 88, an enable in 89, and an enable out 90 of the input 74 and output the 75. FIGS. 7-8B do not show the third through $n^{th}$ component modules 42 and 43 or the third through $n^{th}$ syrup modules 58 and 59, and the third through $n^{th}$ component modules 42 and 43 or the third through $n^{th}$ syrup modules 58 and 59 will not been described because their configuration and operation are identical to the first and second component modules 40 and 41 or the first and second syrup modules 56 and 57.

The inclusion of the microcontroller 83 in the first component module 40 or the first syrup module 56 allows monitoring and control functions associated with the first component module 40 or the first syrup module 56 to be distributed to the first component module 40 or the first syrup module 56. Illustratively, the first syrup module 56 may include a valve that regulates the flow of syrup from the fountain drink dispenser 11, and the microcontroller 83 controls the valve to regulate the syrup flow therefrom. Example valves include but are not limited to open/close shut off valves, volumetric valves arranged in an open loop configuration, and volumetric valves arranged in a closed loop configuration. Accordingly, when a dispense of syrup is required from a fountain drink dispenser 11 including an open/close shut off valve, the CPU module 10 instructs the microcontroller 83 to perform the dispense. Responsively, the microcontroller 83 outputs a signal that opens the open/close shut off valve until the completion of the syrup dispense. When a dispense of syrup is required from a fountain drink dispenser 11 including a volumetric valve arranged in an open loop configuration, the CPU module 10 instructs the microcontroller 83 to perform the dispense. Responsively, the microcontroller 83 outputs a signal that toggles a solenoid valve of the volumetric valve at a frequency that delivers syrup at a desired flow rate until the completion of the syrup dispense. When a dispense of syrup is required from a fountain drink dispenser 11 including a volumetric valve arranged in a closed loop configuration, the CPU module 10 instructs the microcontroller 83 to perform the dispense. Responsively, the microcontroller 83 outputs a signal that opens a solenoid valve of the volumetric valve, a signal that sets the pulse width modulation frequency of the volumetric valve, and a signal that sets the pulse width modulation duty cycle of the volumetric valve, thereby delivering syrup at a desired flow rate until the completion of the syrup dispense. The microcontroller 83 further may monitor the valve to supply valve information such as syrup flow rate. The second component module 41 or the second syrup module 57 will not been described because their configuration and operation are identical to the first component module 40 or the first syrup module 56.

The preferred embodiment uses serial communications to implement bus 70 in a daisy chain configuration and accomplish the connection of the CPU module 10 to the first through $n^{th}$ component modules 40-43 or the first through $n^{th}$ syrup modules 56-59. Nevertheless, those of ordinary skill in the art will recognize that parallel communications could be used to implement bus 70 in the daisy chain configuration. Consequently, the first component module 40 or the first syrup module 56 includes the bus interface 84 to provide control over the bus 70 so that the microcontroller 83 can access the bus 70 to communicate with the CPU module 10 without interference from the microcontroller 87 of the second component module 41 or the second syrup module 57 as well as the microcontrollers of the third through $n^{th}$ component modules 42 and 43 or the third through $n^{th}$ syrup modules 58 and 59. The bus interface 84 is any bus interface suitable to facilitate communications over the bus 70, such as for example RS485. As illustrated in FIGS. 8A and 8B, the first component module 40 or the first syrup module 56 in the preferred embodiment uses a UART 91 to implement communications. Nevertheless, those of ordinary skill in the art will recognize that in the preferred embodiment the UART 91 may be contained in the microcontroller 83 or may be a UART implemented in software. The bus interface 88 and the UART 92 of the second component module 41 or the second syrup module 57 as well as the bus interfaces and UART's of the third through $n^{th}$ component modules 42 and 43 or the third through $n^{th}$ syrup modules 58 and 59 will not be described because their configuration and operation are identical to the bus interface 84 and the UART 91 of the first component module 40 or the first syrup module 56.

The busses 70A-D of the bus 70 shown in FIG. 8A each include an enable line 93, a power line 94, a ground line 95, and a communication line 96 to implement the first through $n^{th}$ component modules 40-43 or the first through $n^{th}$ syrup modules 56-59 in a daisy chain configuration. Illustratively, the enable line 93 of the bus 70A connects an enable in pin 98 of the enable in 85 for the input 72 of the first component module 40 or the first syrup module 56 to an enable line of the CPU module 10, which is asserted in the preferred embodiment. The enable in 98 pin connects to the bus interface 84 via a receive enable line 110, while the microcontroller 83 connects to an enable out pin 102 of the enable out 86 for the output 73 of the first component module 40 or the first syrup module 56 via a send enable line 111. The enable out pin 102 connects to an enable in pin 106 of the enable in 89 for the input 74 of the second component module 41 or the second syrup module 57 via the enable line 93 of the bus 70B.

The power line 94 of bus 70A connects a power in pin 99 of the input 72 for the first component module 40 or the first syrup module 56 to a power line for the CPU module 10. The power in pin 99 accordingly facilitates the distribution of power from the CPU module 10 to the microcontroller 83, the bus interface 84, and the UART 91. The power in pin 99 further connects to a power out pin 103 of the output 73 for the first component module 40 or the first syrup module 56. The power out pin 103 connects to a power in pin 107 of the input 74 for the second component module 41 or the second syrup module 57 via the power line 94 of the bus 70B, thereby distributing power from the CPU module 10 to the second component module 41 or the second syrup module 57.

The ground line 95 of bus 70A connects a ground in pin 100 of the input 72 for the first component module 40 or the first syrup module 56 to the ground for the CPU module 10. The ground in pin 100 accordingly grounds the microcontroller 83, the bus interface 84, and the UART 91 to the ground for the CPU module 10. The ground in pin 100 further connects to a ground out pin 104 of the output 73 for the first component module 40 or the first syrup module 56. The ground out pin 104 connects to a ground in pin 108 of the input 74 for the second component module 41 or the second syrup module 57 via the ground line 94 of the bus 70B, thereby grounding the second component module 41 or the second syrup module 57 to the CPU module 10.

The communication line 96 of bus 70A connects a communication in pin 101 of the input 72 for the first component module 40 or the first syrup module 56 to the communication line for the CPU module 10. The communication in pin 101 connects to the bus interface 84 to furnish a communication line between the microcontroller 83 and the CPU module 10. The communication in pin 101 further connects to a communication out pin 105 of the output 73 for the first component module 40 or the first syrup module 56. The communication out pin 105 connects to a communication in pin 109 of the input 74 for the second component module 41 or the second syrup module 57 via the communication line 96 of the bus 70B, thereby providing a communication line between the second component module 41 or the second syrup module 57 and the CPU module 10. The remaining connections among the second through $n^{th}$ component modules 41-43 or the second through $n^{th}$ syrup modules 57-59 via busses 70C and 70D will not be described because their configuration and operation are identical to the connections among the CPU module 10 and the first and second component modules 40 and 41 or the first and second syrup modules 56 and 57 via the busses 70A and 70B.

The busses 70A-D of the bus 70 shown in FIG. 8B each include an enable line 93, a power line 94, a ground line 95, a communication A line 112, and a communication B line 113 to implement the first through $n^{th}$ component modules 40-43 or the first through $n^{th}$ syrup modules 56-59 in a daisy chain configuration. The enable line 93, the power line 94, and the ground line 95 and their connection among the first and second component modules 40 and 41 or the first and second syrup modules 56 and 57 via the busses 70A and 70B is the same as described above with reference to FIG. 8A.

The busses 70A-D however include the communication A line 112 and the communication B line 113 to provide differential communications that reduce noise and transmission error. Illustratively, the communication A line 112 of bus 70A connects a communication in pin 114 of the input 72 for the first component module 40 or the first syrup module 56 to the communication line for the CPU module 10. Similarly, the communication B line 113 of bus 70A connects a communication in pin 115 of the input 72 for the first component module 40 or the first syrup module 56 to the communication line for the CPU module 10. The communication in pins 114 and 115 connect to the bus interface 84 to furnish a differential communication line between the microcontroller 83 and the CPU module 10. The communication in pins 114 and 115 further connect to respective communication out pins 116 and 117 of the output 73 for the first component 40 or the first syrup module 56. The communication out pins 116 and 117 connect to respective communication in pins 18 and 119 of the input 74 for the second component module 41 or the second syrup module 57 via respective communication A and B lines 112 and 113 of the bus 70B, thereby providing a differential communication line between the second component module 41 or the second syrup module 57 and the CPU module 10. The remaining connections among the second through $n^{th}$ component modules 41-43 or the second through $n^{th}$ syrup modules 57-59 via busses 70C and 70D will not be described because their configuration and operation are identical to the connections among the CPU module 10 and the first and second component modules 40 and 41 or the first and second syrup modules 56 and 57 via the busses 70A and 70B.

The communications enabled through the bus interface 84 requires the implementation of an addressing scheme whereby the CPU module 10 and the microcontroller 83 can communicate without interference from the microcontroller 87 of the second component module 41 or the second syrup module 57 as well as the microcontrollers of the third through $n^{th}$ component modules 42 and 43 or the third through $n^{th}$ syrup modules 58 and 59. Consequently, upon the initialization of the CPU module 10, the bus interface 84 is "on" due to the receipt of an "enable on" signal from the CPU module 10 via the enable line 93 of the bus 70A, the enable in pin 98, and the receive enable line 110. In the preferred embodiment, the "enable on" signal from the CPU module 10 is generated due to the connection of the asserted enable line 93. Furthermore, the microcontroller 83 outputs via the send enable line 111 an "enable off" signal to the enable out pin 102. Likewise, the microcontroller 87 and the microcontrollers of the third through $n^{th}$ component modules 42 and 43 or the third through $n^{th}$ syrup modules 58 and 59 output an "enable off" signal to their respective enable out pins. As a result, the bus interface 84 is "on" thus enabling the reception of communications from the CPU module 10, while the bus interface 88 and the bus interfaces of the third through $n^{th}$ component modules 42 and 43 or the third through $n^{th}$ syrup modules 58 and 59 are "off" thus disabling the reception of communications from the CPU module 10.

Thus, during initialization when the CPU module 10 outputs a component identifier signal, only the microcontroller 83 of the first component module 40 or the first syrup module 56 responds. The component identifier signal in the preferred embodiment requests a response from the first available component module, which in the illustration of FIGS. 8A and 8B is the first component module 40 or the first syrup module 56. Once the CPU module 10 receives a response, it provides an address for the first component module 40 or the first syrup module 56 to permit communications therebetween and begins by requesting the microcontroller 83 transmit its component type. Illustratively, the microcontroller 83 would inform the CPU module 10 it is a syrup module.

Similarly, the CPU module 10 and the microcontroller 87 must be able to communicate without interference from the microcontroller 83 of the first component module 40 or the first syrup module 56 as well as the microcontrollers of the third through $n^{th}$ component modules 42 and 43 or the third through $n^{th}$ syrup modules 58 and 59. After determining the component type from microcontroller 83, the CPU module 10 directs the microcontroller 83 to output via the send enable line 111 an "enable on" signal to the enable out pin 102. The bus interface 88 receives the "enable on" signal via the enable line 93 of the bus 70B, the enable in pin 106, and the receive enable line of the second component module 41 or the second syrup module 56 and turns "on" accordingly. The CPU module 10 also instructs the microcontroller 83 to ignore the next component identifier signal so that only the microcontroller 87 of the second component module 41 or the second syrup module 57 responds. Once the CPU module 10 receives a response from the microcontroller 87, it provides an address for the second component module 41 or the second syrup module 57 to permit communications therebetween and begins by requesting the microcontroller 87 transmit its component type. Illustratively, the microcontroller 87 would inform the CPU module 10 it is a syrup module. The assigning of addresses by the CPU module 10 for each of the third through $n^{th}$ component modules 42 and 43 or the third through $n^{th}$ syrup modules 58 and 59 will not be described because it is identical to the assigning of addresses for the first and second component modules 40 and 41 or the first and second syrup module 56 and 57.

After the CPU module 10 assigns an address and ascertains the component type for each of the first through $n^{th}$ component modules 40-43 or the first through $n^{th}$ syrup modules 56-59, the CPU module 10 can communicate with any one of the first through $n^{th}$ component modules 40-43 or the first through $n^{th}$ syrup modules 56-59 without interference from the remaining first through $n^{th}$ component modules 40-43 or first through $n^{th}$ syrup modules 56-59. Illustratively, when the CPU module wishes to communicate with the second component module 40 or the second syrup module 57, the CPU module 10 outputs on the communication line 96 or the communication A and B lines 112 and 113 the address for the second component module 40 or the second syrup module 57 along with the communication. The microcontroller 83 of the first component module 40 or the first syrup module 56 as well as the microcontrollers for the third through $n^{th}$ component modules 42-43 or the third through $n^{th}$ syrup modules 58-59 recognize the address is not for the first component module 40 or the first syrup module 56 or any one of the third through $n^{th}$ component modules 42-43 or the third through $n^{th}$ syrup modules 58-59 and thus ignore the communication. The microcontroller 87 of the second component module 41 or the second syrup module 57 however recognizes the address is for the second component module 41 or the second syrup module 57 and thus receives the communication. In the preferred embodiment, each communication from the CPU module 10 elicits a response from the particular one of the first through $n^{th}$ component modules 40-43 or the first through $n^{th}$ syrup modules 56-59 receiving the communication. Consequently, when the microcontroller 87 wishes to communicate a response to the CPU module 10, the bus interface 88 of the second component module 41 or the second syrup module 57 seizes control of the bus 70 so that the microcontroller 87 can output the communication, which is received by the CPU module 10.

While the preferred embodiment implements a cascaded enable in and enable out addressing scheme, those of ordinary skill in the art will recognize many other addressing schemes. Illustratively, alternative addressing schemes not requiring the cascaded enable in and enable out include, but are not limited to, the inclusion of DIP switches, silicon serial numbers, or the like on the component modules.

Accordingly, as described above, the CPU module 10 issues instructions to the microcontrollers of the first through $n^{th}$ component modules 32-47 of component classes 1-n of the food/beverage dispenser 17 or first through $n^{th}$ component modules 32-43 of component classes 1-3 and any additional component modules 44-47 of the food/beverage dispenser 17. The microcontrollers responsive to the issued instructions perform the tasks necessary for the food/beverage dispenser 17 to deliver a food/beverage to an end user. As such, the CPU module 10 provides master command and control over the first through $n^{th}$ component modules 32-47 of component classes 1-n of the food/beverage dispenser 17 or first through $n^{th}$ component modules 32-43 of component classes 1-3 and any additional component modules 44-47, which locally execute monitoring and control instructions, thereby providing the food/beverage dispenser 17 with a distributed architecture. In distributing monitoring and control to component modules 32-47, it should be understood that many components might be interfaced with the CPU module 10. Illustratively, one of the component modules 32-47 could be the auxiliary communications interface 31, which would be physically separate from the CPU module 10 but electrically coupled thereto via one of the busses 68-71.

Figure 9A:
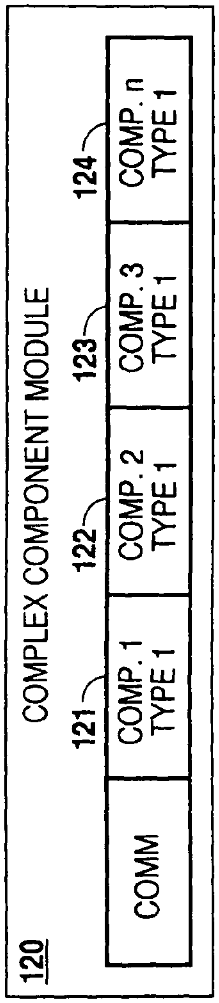
FIGS. 9A-9C show, in functional block diagrams, component modules of a food/beverage dispenser.
Figure 9B:
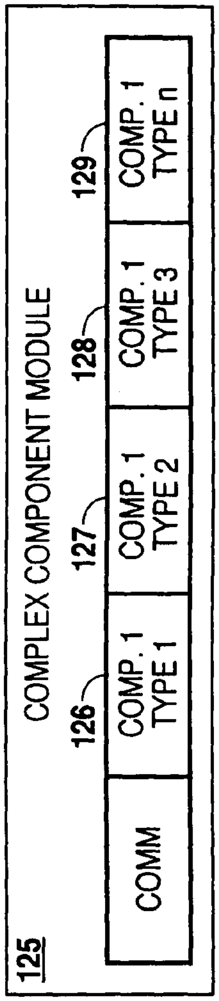
Figure 9C:
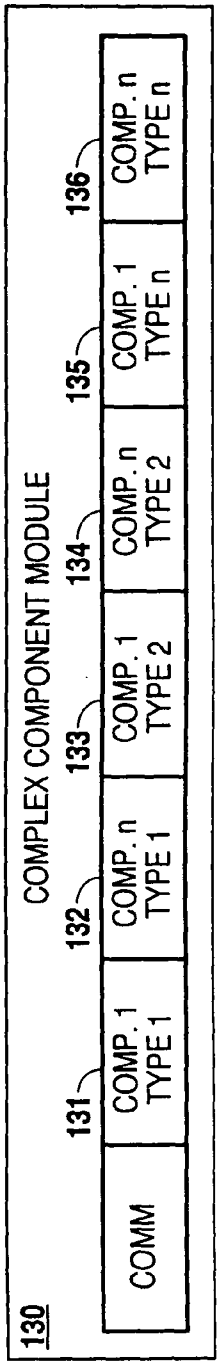

While the food/beverage dispenser 17 may be implemented in first through $n^{th}$ component modules 32-47 arranged according to classes as well as in additional component modules 44-47, those of ordinary skill in the art will recognize the food/beverage dispenser 17 may be implemented in more complex component modules. Illustratively, as shown in FIG. 9A, a complex component module 120 may include a communications interface and a microcontroller that monitors and controls 1-n different components 121-124 of the same type, such as for example several syrup or water components. Alternatively, as shown in FIG. 9B, a complex component module 125 may include a communications interface and a microcontroller that monitors and controls components 126-129 of 1-n different types, such as for example one keypad component, one water component and one syrup component. Still further, as shown in FIG. 9C, a complex component module 130 may include a communications interface and a microcontroller with sufficient computing power to control 1-n components 131-132 of the same type 1, 1-n components 133-134 of the same type 2, and 1-n components 135-136 of the same type n, such as for example one keypad component, one water component plumbed with carbonated water, one water component plumbed with non-carbonated water, and four syrup components.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope accordingly, is not to be limited in any respect by the foregoing description; rather, it is defined only by the claims that follow.

What is claimed is:

1. A food/beverage dispenser, comprising:

a housing;

a CPU module disposed in the housing that monitors and/or controls operations for the food/beverage dispenser;

a first component module disposed in the housing and coupled with the CPU module, wherein:

the first component module is enabled during initialization of the food/beverage dispenser, the CPU module outputs a component identifier signal to the first component module, the first component module responds to the component identifier signal output by the CPU module, and the CPU module assigns an address to the first component module after receiving a response to the component identifier signal, thereby establishing communication between the CPU module and the first component module; and the first component module controls an operation of the food/beverage dispenser responsive to instructions received from the CPU module.

2. The food/beverage dispenser according to claim 1, wherein the CPU module requests the first component module provide a component type after assigning an address to the first component module.

3. The food/beverage dispenser according to claim 1, further comprising a second component module disposed within the housing and coupled to the CPU module through a bus connection with the first component module, the second component module controlling an operation of the food/beverage dispenser responsive to instructions received from the CPU module, wherein the CPU module instructs the first component module to enable the second component module after assigning an address to the first component module.

4. The food/beverage dispenser according to claim 3, wherein the CPU module outputs a component identifier signal and instructs the first component module to ignore the component identifier signal.

5. The food/beverage dispenser according to claim 4, wherein the second component module responds to the component identifier signal output from the CPU module.

6. The food/beverage dispenser according to claim 5, wherein the CPU module assigns an address for the second component module after receiving a response to the component identifier signal, thereby establishing communication between the CPU module and the second component module.

7. The food/beverage dispenser according to claim 6, wherein the CPU module requests the second component module provide a component type after assigning an address to the second component module.

8. A method of establishing communication between a CPU module and component modules of a food/beverage dispenser, comprising:

providing a housing for the food/beverage dispenser including the CPU module and component modules disposed therein;

enabling a first component module during initialization of the food/beverage dispenser;

outputting a component identifier signal from the CPU module to the first component module;

outputting a response from the first component module to the CPU module; and assigning an address for the first component module after the CPU module receives a response to the component identifier signal from the first component module.

9. The method of establishing communication between a CPU module and component modules of a food/beverage dispenser according to claim 8, further comprising requesting the first component module provide a component type after assigning an address to the first component module.

10. The method of establishing communication between a CPU module and component modules of a food/beverage dispenser according to claim 8, further comprising:

instructing the first component module to enable a second component module;

instructing the first component module to ignore a component identifier signal;

outputting a component identifier signal from a CPU module to the second component module;

outputting a response from the second component module to the CPU module; and assigning an address for the second component module after the CPU module receives a response to the component identifier signal from the first component module.

11. The method of establishing communication between a CPU module and component modules of a food/beverage dispenser according to claim 10, further comprising requesting the second component module provide a component type after assigning an address to the second component module.

* * * * *